United States Patent Office 3,538,550
Patented Nov. 10, 1970

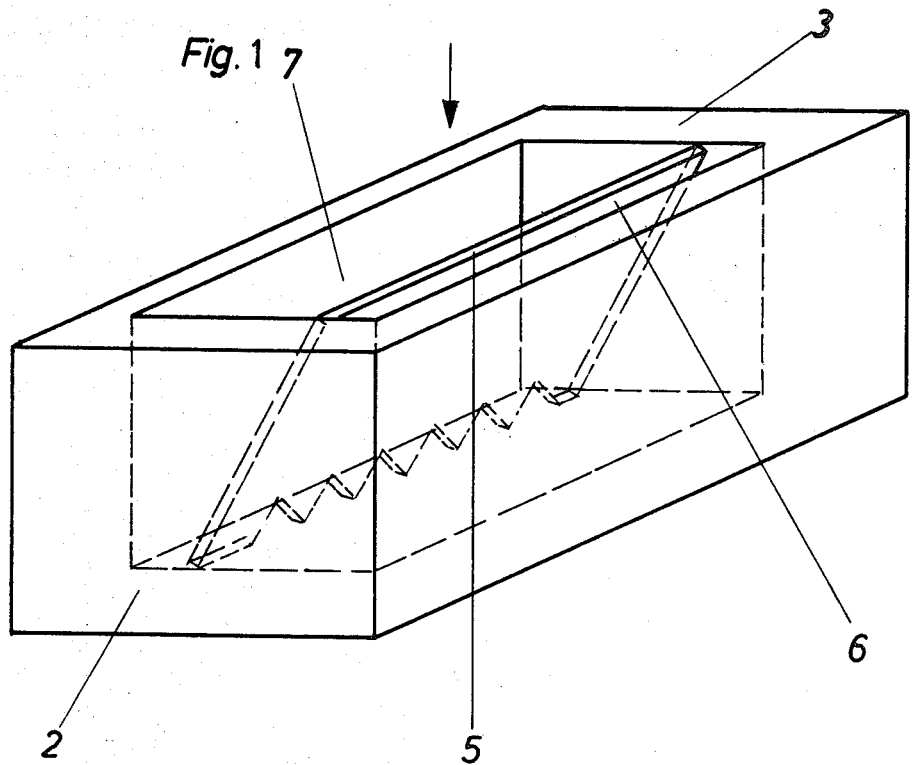
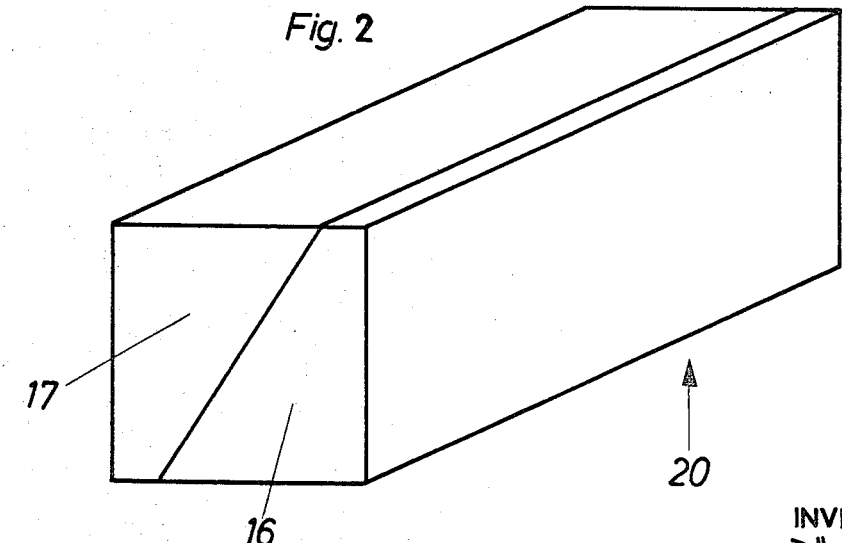

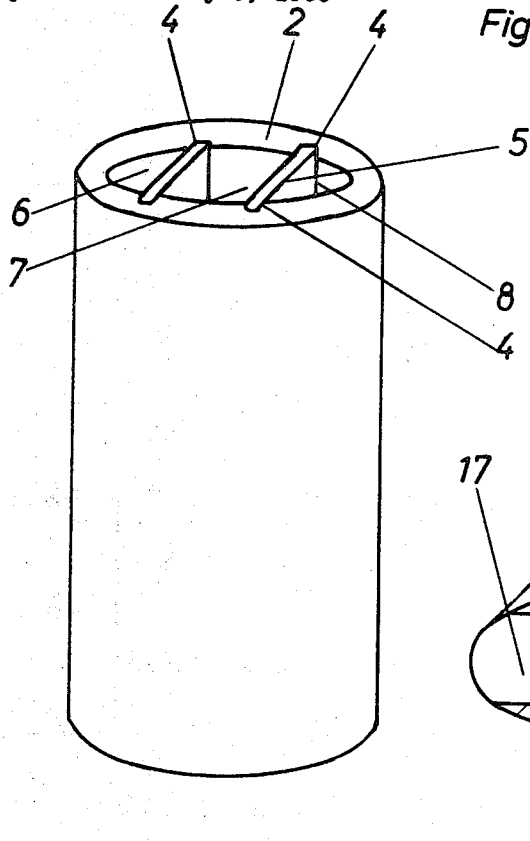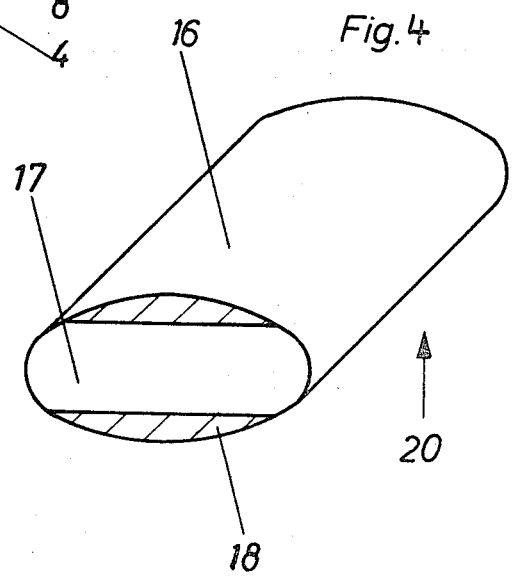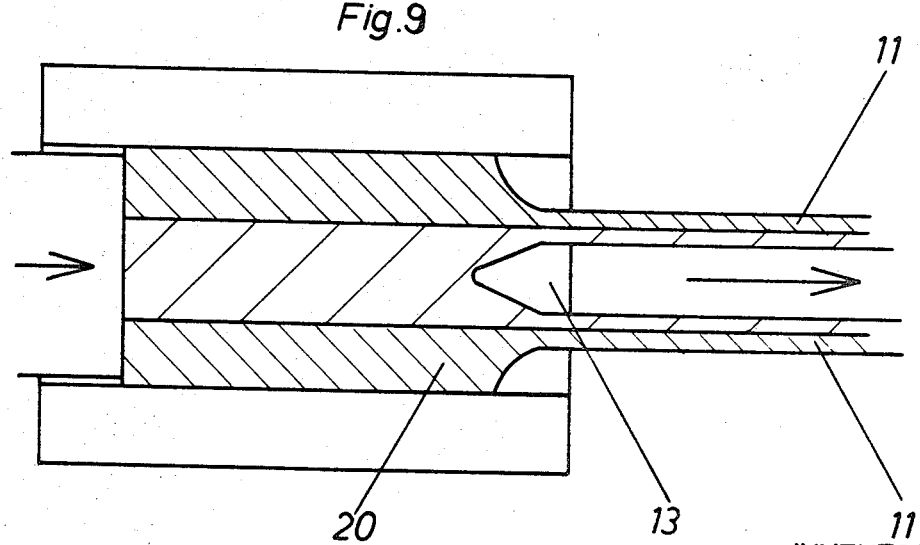

3,538,550
PARTITIONED MOLD DIE
Eugen Dürrwächter, Carl-Ludwig Meyer, Ulf Harmsen, and Wolfgang Pöttken, Pforzheim, Germany, assignors to Eugen Durrwachter Doduco, Pforzheim, Germany
Original application May 3, 1966, Ser. No. 547,282, now Patent No. 3,510,935, dated May 12, 1970. Divided and this application July 17, 1968, Ser. No. 767,869
Claims priority, application Germany, Jan. 3, 1966, D 49,065, D 49,066, D 49,067
Int. Cl. B29c 1/00
U.S. Cl. 18—34
9 Claims

ABSTRACT OF THE DISCLOSURE

A die for holding powdered materials such as metals while they are being compacted to form multilayer objects includes opposite side walls defining an open-topped die. Parallel grooves are formed in the side walls and a removable partition is mounted in the grooves to define open topped compartments in the interior of the die for holding materials which form separate layers.

CROSS REFERENCE TO RELATED APPLICATION

This application is a division of copending application Ser. No. 547,282, filed May 3, 1966, now Pat. No. 3,510,-935, issued May 12, 1970.

Field of the invention

This invention relates to apparatus for manufacturing of multilayered articles by powder-metallurgical methods.

Description of the prior art

Multilayer semifinished material in the form of profiled rods and strips is used in the electrical industry for the manufacture of contact pieces, into which the rods or strips are divided.

In many cases, the requirements to be met by the materials for such contact pieces as regards electrical and mechanical wear resistance when used in applications involving high currents and voltages are often so high that these requirements cannot be fulfilled with pure metals or alloys. For this reason, composite materials of heavy metals, such as silver and copper, rare metals, such as tungsten and molybdenum, and their oxides, carbides, borides and sulfides are being used to an increasing extent as contact materials rather than pure metals or alloys. A composite of silver and cadmium oxide has proved particularly suitable for such contact pieces. In addition to purely metallic materials and composite materials consisting of a metal and a metal oxide, metal-metalloid composite mterials have also been used for contact pieces.

These materials are made by powder metallurgy. They are introduced in the form of a powder or a powder mixture into a die, in which they are compacted by pressure and then sintered by heating. For this reason such materials are also described as sintered materials. Such contact materials are brittle and even after repeated compacting and sintering are not entirely free of pores. For this reason the metallic bond is often inadequate so that the contacts tend to be consumed at a high rate under the action of an electric arc.

Contact materials which contain admixtures that prevent welding between contacts obviously cannot be properly welded or soldered to the contact carrier. In such cases it is known to provide a solderable layer, in most cases of pure silver or pure copper, before the individual contact plates are pressed, and to join this layer to the rest of the contact plates by the pressing and sintering treatments.

A large part of the contact materials which have been described can be shaped to such an extent that the sintered locks can be formed into sheets or other ductile semifinished materials by hot and cold rolling, particularly if the second component has been added only in relatively small amounts. This practice enables a much better metallic bond as well as a perfect freedom of pores and consequently an improved electrical wear resistance. So far, however, the use of materials made by such processes has been restricted to parts which are made with strictly mechanical joints, such as riveted, screwed or clamped joints, etc. Such joints are not sufficient for large, high-duty switching equipment. Contacts which have large surfaces and are intended for extremely heavy loads must be secured by welding or soldering as a rule. With the above-mentioned composite materials, a special, solderable layer is required for this purpose in most cases. As it was previously possible to manufacture such multilayer materials only in the brittle and porous form which has been described hereinbefore, the advantages of sintered contact materials have not been fully available in most cases.

In connection with Ag-CdO, which is the most important material for contacts in switching equipment for low voltages, the above considerations have caused the sintering process to be increasingly superseded by an internal oxidation process, in which a ductile Ag-Cd alloy is transformed by prolonged annealing into Ag-CdO. Many processes are known for providing such internally oxidized materials with a solderable layer.

So far, Ag-CdO materials made by these processes have been predominant on the market in spite of various disadvantages, such as brittleness caused by an enriching of CdO at the grain boundaries. Powder-metallurgical methods of manufacture have not re-gained importance until more ductile semifinished materials were provided, which are produced from large blocks by rolling, extruding or drawing. As these powder-metallurgical products had to be secured by mechanical means, their use was restricted to relatively small equipment.

The process claimed in our above mentioned copending application produces a sintered semifinished material which is ductile and perfectly free of pores and comprises a firmly adherent layer which can be soldered with good results. Former attempts to subsequently apply such well solderable layers by pressure welding (pressure bonding) or roll cladding (roll bonding) have not resulted in a joint of sufficient strength.

The process enables the manufacture of a sintered, ductile composite material which is free of pores and provided with a firmly adhering layer, which can be soldered with good results.

As is described in greater detail in our above co-pending application a contact piece is made from a rod-shaped multilayer semifinished material which is extruded from a multilayer block, which in turn has been made by powder-metallurgical methods utilizing the compacting die claimed in the present application. At least one outer layer of the multilayer block consists of sintered material.

It has surprisingly been found that the extruding of the sintered material eliminates the above-mentioned brittleness of the material and transforms the same into a ductile material. This ductility is probably due to the oriented fibrous structure, which is imparted to any extruded material.

If an outer layer of silver or copper is provided, the finished contact piece can easily be soldered to the contact carrier. It is also possible to provide an inner layer of silver or copper and to divide the semifinished materials or the contact piece in the direction of its axis.

The present invention helps eliminate the above-mentioned difficulties in the manufacture of contact pieces. In the manufacture of the multilayer semifinished material, a multilayer block is initially made from powders or powder mixtures by compacting and subsequent sintering. This block is then shaped by an extruder into a multilayer extrusion.

In the manufacture of the block, which has preferably the shape of a rectangular prism, by powder-metallurgical methods described in the mentioned co-pending application, the various powders or powder mixtures are charged into an upright compacting die, which is divided by partitions. The die is then vibrated, the partitions are removed and the powders are compacted in the die to form the block. If a horizontal die is used, the different powders which form the various layers may be charged in succession without partitions.

FIG. 1 shows a compacting die for the manufacture of a block as shown in

FIG. 2, before the charging of the powder.

FIG. 3 shows a compacting die for the manufacture of a block as shown in

FIG. 4, before the charging of the powder.

FIG. 5 shows a compacting die for the manufacture of a block as shown in

FIG. 6, before the charging of the powder.

FIG. 7a–f show rod-shaped semifinished materials made by extrusion from sintered blocks.

FIG. 9 is a longitudinal sectional view illustrating one way in which a multilayer block might be extruded by using a die according to the invention.

In extruding multilayer blocks, it has been conventional to effect a preferential extrusion first of the inner layers and subsequently of the outer layers. As a result, the thickness of the layers varied over the length of the semifinished material so that the contact pieces made from the semifinished material were not identical. Whereas this disadvantage can be avoided by indirect extrusion processes, indirect extruders are highly expensive. For this reason, a cast multilayer block has been provided, in which the layers were designed with such a variation in thickness that the thickness of the layers in a semifinished material produced from such block with the aid of a normtl (direct) extruder remains constant throughout the length of the extrusion.

When a multilayer block having between its layers an interface which slopes in the axial direction is formed in the process according to the invention, the side walls of an upright compacting die are provided according to another feature of the invention with grooves for guiding the partitions and for locating the partitions so as to obtain the desired variation of the thickness of the layers in the finished block.

According to the invention, that edge of each partition which is at the bottom during the charging of the powder is serrated, canted or roughened. There is thus provided means which lie at least partly outside of the plane of the generally plane partition and which cause a mixing of the powder layers in the portions which adjoin both sides of the partition when the same is being pulled out of the powder while the same is still loose so that an interlayer is formed with a gradual transition between the powders. As a result, the layers are merged after compacting and sintering and form a bond of eminent strength.

Figure 5:
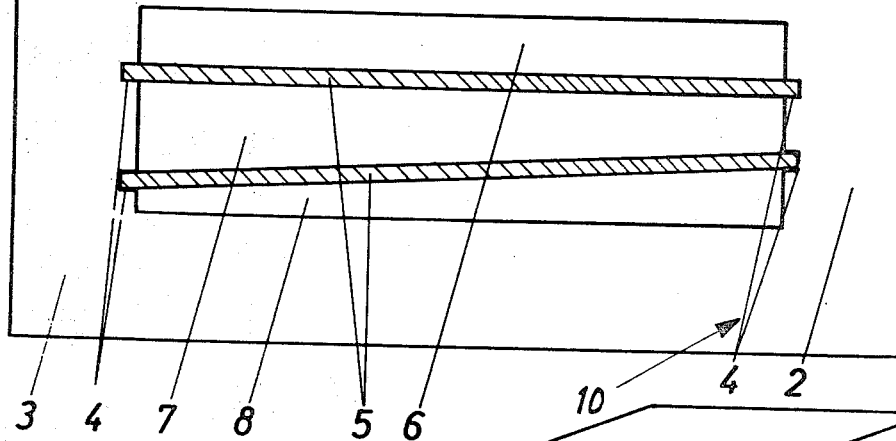
Figure 6:
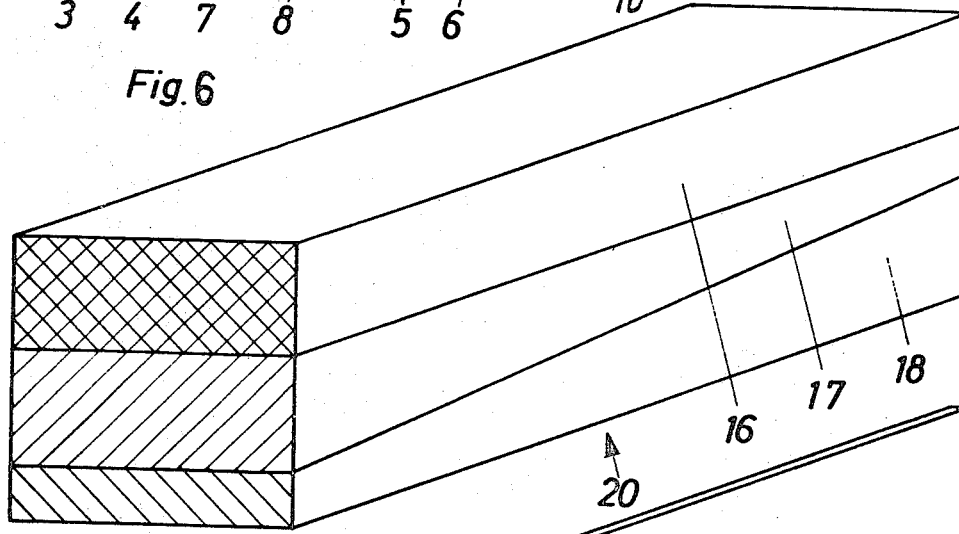

With reference to FIGS. 1, 3 and 5 of the drawings, the side walls 2 and 3 of the compacting die 10 are formed with grooves 4, which receive partitions 5, which define compartments 6, 7, 8.

Different powders are charged into these compartments and may be vibrated. The partitions 5 are then pulled out and the powders are compacted to form a block 20.

The lower edge 14 of the partition 5 terminates in lugs, which are canted or set like saw teeth. Alternatively, the edge 14 may be formed with other projections or may be otherwise formed so as to intermix the powders separated by the partitions when the partition 5 is being removed. This results in the formation of a transition zone between the powder layers.

Figure 7A:
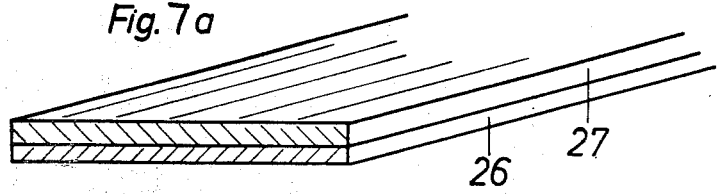
Figure 7B:
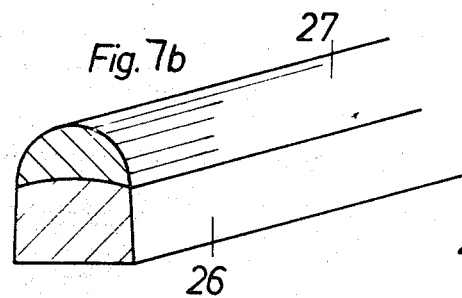
Figure 7C:
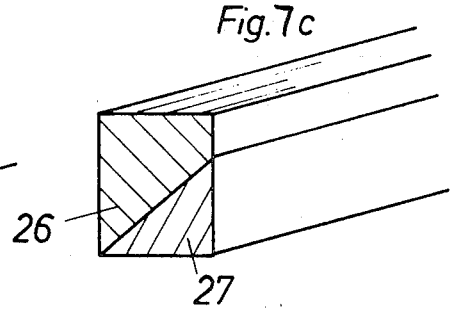
Figure 7D:
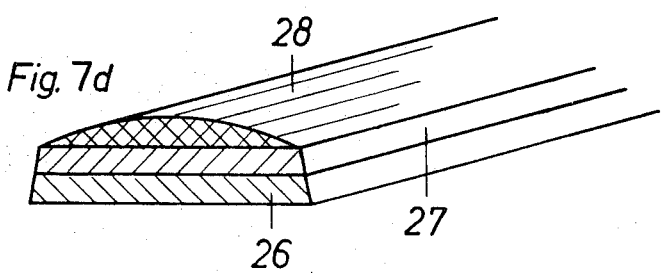
Figure 7E:
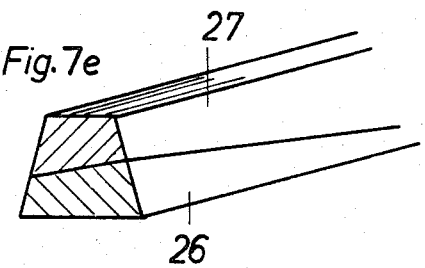
Figure 7F:
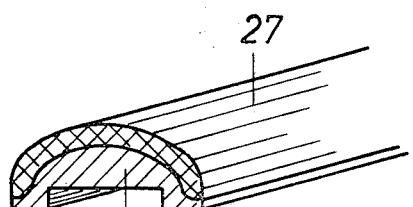
Figure 8:
FIG. 8 shows a contact piece which has been cut from an extruded rod-shaped semifinished material.

The block may be circular, elliptic, triangular or polygonal in cross-section. The most desirable form of the block is that of a prism of square cross-section (FIG. 2). The layers 16, 17, 18 of the block correspond to the compartments 6, 7 and 8 of the compacting die. The thickness of the layers has such a calculated variation over the length of the block in that, after extrusion of the multilayer block, the layers 26, 27 and 28 of the semifinished material 30 (FIGS. 7a–f) have a uniform thickness throughout their length or a thickness which varies in a desired manner throughout their length (FIG. 7e). All contact pieces 40 (FIG. 8) which have been cut from a semifinished material having layers of uniform thickness are identical.

Figure 10A:
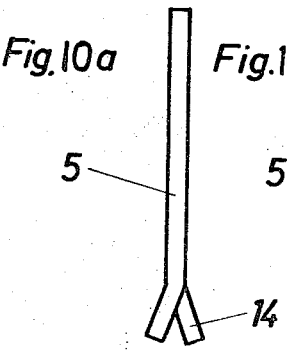
FIGS. 10a and 10b show a partition which may be used with compacting dies according to the invention.
Figure 10B:
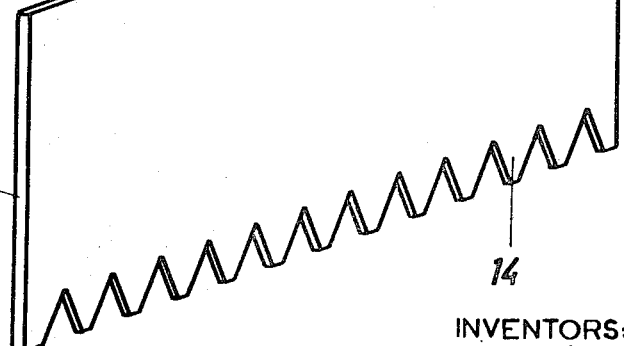

The contact layer 40 has usually two layers, namely, at one outside surface a layer of contact material, such as a composite material of silver and cadmium oxide, and on the other outside surface a layer of a solderable material, such as silver or copper. A contact piece which has layers of contact material on both outside surfaces and an intermediate layer of solderable material may be divided at its center. As is apparent from FIG. 10, a three-layer block 10 may be extruded through a die 13 having two orifices to obtain two two-layer extrusions 11.

Our copending application discloses nine examples of particular powder mixture which might be used for particular purposes. Two will be here described to illustrate the use of the claimed compacting die.

EXAMPLE 1

An upright rectangular compacting die which is divided by a partition extending in the longitudinal direction of the rectangle is charged on one side of the partition with pure silver powder and on the other side with a mixture of 90% silver powder and 10% cadmium oxide (CdO) powder and is then vibrated. Thereafter the partition is pulled out of the die and the powder in the die is compacted to form a block which is approximately square in cross-section. This block is subsequently heated slowly to the sintering temperature of about 900° C. and is thereafter sintered for two hours and from the sintering furnace is directly introduced into the receiver of a horizontal extruder.

The block is extruded to form a rectangular prismatic extrusion having a cross-section of about 5 mm. x 80 mm. This extrusion consists in about ⅓ of its thickness or pure silver, balance 90% Ag and 10% CdO. This extrusion is further processed in the usual manner and used for the manufacture of contact pieces, which can be well soldered on one side.

EXAMPLE 2

An upright compacting die is used which is round in cross-section and provided with two partitions. The intermediate compartment between the two partitions is charged with a mixture of 90% silver powder, 5% zinc oxide powder and 5% cadmium oxide powder. The two outer compartments are charged with a powder mixture consisting of 70% pure silver and 30% silver carbonate. The die is then vibrated. Both partitions are pulled and the powder in the die is compacted to form a cylindrical compact block, which is sintered as in Example 5 and then introduced into the receiver of an upright extruder and extruded through a two-orifice die to form two rectangular prismatic metal extrusions having each a cross-section of about 4 mm. x 60 mm. The resulting metal extrusions consist now of pure silver in about 20% of their total thickness, balance Ag-CdO-Zn.

In all examples, the powder mixtures were as homogeneous as possible. This is promoted by stirring the powders during mixing. The particle size of the powders was 2-3 microns. The vibrating of the compacting dies is controlled to avoid an unmixing of the powder mixtures.

We claim:
1. An open-topped compacting die, which comprises at least one removable partition defining open-topped compartments in the interior of said die, said partition being generally plane and having at its lower edge portion means which lie at least portly outside said plane for agitating and intermixing the contents of said die adjacent to said partition during the removal of said partition.

2. A die as set forth in claim 1, in which said lower edge portion is formed with laterally projecting lugs which constitute said means.

3. A die as set forth in claim 1, in which said lower edge portion is formed with canted teeth which constitute said means.

4. A die as set forth in claim 1, in which said lower edge portion is roughened, said roughened lower edge portion constituting said means.

5. A die as set forth in claim 1 and having opposite side walls formed with at least one pair of opposite parallel grooves, said partition extending between said side walls and being inserted in said grooves.

6. A die as recited in claim 5 in which said grooves are inclined.

7. A die as recited in claim 1 in which said means include openings in said partition to permit intermixture of materials on opposite sides of the partition.

8. A die as recited in claim 7 in which said openings intersect the lower edge of the partition.

9. A die as set forth in claim 1, in which said means are of one piece with said partition.

References Cited

UNITED STATES PATENTS

| | | | |
|---|---|---|---|
| 243,504 | 6/1881 | Carnell | 249—131 X |
| 1,030,480 | 6/1912 | Packard. | |
| 2,081,078 | 5/1937 | Watson | 249—131 X |
| 2,208,054 | 7/1940 | Reed | 25—103 X |
| 2,297,558 | 9/1942 | Hintze et al. | 249—131 X |
| 2,466,432 | 4/1949 | Jenkins | 75—208 X |
| 2,496,616 | 2/1950 | Barton. | |
| 2,552,090 | 5/1951 | Eusner | 25—103 |
| 2,819,510 | 1/1958 | Vom Norden | 249—131 X |
| 2,958,917 | 11/1960 | Harris | 25—103 X |
| 3,010,196 | 11/1961 | Smith et al. | |
| 3,191,272 | 6/1965 | Gwyn | 29—630 |
| 3,199,176 | 8/1965 | Treudiger et al. | 29—630 |
| 3,317,991 | 5/1967 | Haarbye | 29—420.5 |
| 3,331,962 | 7/1967 | Kuhl | 29—420.5 X |
| 3,359,622 | 12/1967 | Meyer et al. | 29—420.5 |

J. HOWARD FLINT, JR., Primary Examiner

U.S. Cl. X.R.

18—16; 25—103; 29—630; 75—208; 249—131